US011296605B2

United States Patent
Tsai et al.

(10) Patent No.: US 11,296,605 B2
(45) Date of Patent: Apr. 5, 2022

(54) SYNCHRONOUS RECTIFIER CONTROLLERS WITH SLEW-RATE DETECTOR

(71) Applicant: Weltrend Semiconductor Inc., Hsinchu (TW)

(72) Inventors: Chih-Chiao Tsai, Hsinchu (TW); Jui-Chang Chuang, Hsinchu (TW)

(73) Assignee: WELTREND SEMICONDUCTOR INC.

( * ) Notice: Subject to any disclaimer, the term of this patent is extended or adjusted under 35 U.S.C. 154(b) by 0 days.

(21) Appl. No.: 15/930,690

(22) Filed: May 13, 2020

(65) Prior Publication Data
US 2021/0067026 A1 Mar. 4, 2021

(30) Foreign Application Priority Data
Aug. 29, 2019 (TW) .................. 108131075

(51) Int. Cl.
*H02M 3/335* (2006.01)
*H02M 1/08* (2006.01)
*H02M 1/00* (2006.01)

(52) U.S. Cl.
CPC ......... *H02M 3/33523* (2013.01); *H02M 1/08* (2013.01); *H02M 3/33592* (2013.01); *H02M 1/0025* (2021.05); *H02M 1/0029* (2021.05)

(58) Field of Classification Search
CPC ....... H02M 1/0025; H02M 2001/0025; H02M 1/0029; H02M 2001/0029; H02M 3/335; H02M 3/33507; H02M 3/33576; H02M 3/33592; H02M 1/0038
See application file for complete search history.

(56) References Cited

U.S. PATENT DOCUMENTS

| 7,773,398 | B2* | 8/2010 | Kyono | H02M 3/33592 |
| | | | | 363/127 |
| 8,154,889 | B1* | 4/2012 | Hong | H02M 3/33576 |
| | | | | 363/21.12 |
| 9,906,161 | B1* | 2/2018 | Chen | H02M 7/217 |
| 10,756,640 | B1* | 8/2020 | Radic | H02M 3/1588 |
| 2011/0205761 | A1* | 8/2011 | Tschirhart | H02M 3/3376 |
| | | | | 363/21.02 |
| 2012/0091978 | A1* | 4/2012 | Ishii | H02M 1/36 |
| | | | | 323/271 |
| 2015/0049529 | A1* | 2/2015 | Iorio | H02M 7/217 |
| | | | | 363/89 |
| 2015/0280584 | A1* | 10/2015 | Gong | H02M 3/33515 |
| | | | | 363/21.13 |
| 2016/0294298 | A1* | 10/2016 | Wong | H02M 3/33592 |

(Continued)

*Primary Examiner* — Gustavo A Rosario-Benitez
(74) *Attorney, Agent, or Firm* — McClure, Qualey & Rodack, LLP

(57) ABSTRACT

A synchronous rectifier controller controls a rectification power switch connected in series with a secondary winding between two power lines. The synchronous rectifier has a gate driver and a slew-rate detector. The gate driver drives the rectification power switch. The slew-rate detector detects a channel voltage of the rectification power switch, checks if a slew rate of the channel voltage exceeds a slope threshold. If the slew rate exceeds the slope threshold, the slew-rate detector turns the rectification power switch ON through the gate driver. If the slew rate is less than the slope threshold, the slew-rate detector reduces the slope threshold.

5 Claims, 4 Drawing Sheets

(56) References Cited

U.S. PATENT DOCUMENTS

| | | | | |
|---|---|---|---|---|
| 2017/0047851 A1* | 2/2017 | Huang | ............... | H02M 3/33507 |
| 2017/0353099 A1* | 12/2017 | Yang | ................... | H02M 7/1557 |
| 2018/0091046 A1* | 3/2018 | Krueger | ................. | H02M 1/08 |
| 2019/0020282 A1* | 1/2019 | Li | ........................... | H02M 1/08 |
| 2019/0149058 A1* | 5/2019 | Mao | ..................... | H02H 7/1213 |
| | | | | 363/21.02 |
| 2020/0161985 A1* | 5/2020 | Li | ...................... | H02M 3/33592 |
| 2020/0336071 A1* | 10/2020 | Iorio | ..................... | H02M 1/088 |
| 2020/0343810 A1* | 10/2020 | Xu | .................... | H02M 3/33592 |
| 2021/0028712 A1* | 1/2021 | Yu | ..................... | H02M 3/33584 |

* cited by examiner

US 11,296,605 B2

SYNCHRONOUS RECTIFIER CONTROLLERS WITH SLEW-RATE DETECTOR

CROSS-REFERENCE TO RELATED APPLICATION

This application claims priority to and the benefit of Taiwan Application Series Number 108131075 filed on Aug. 29, 2019, which is incorporated by reference in its entirety.

BACKGROUND

The present disclosure relates generally to switching mode power converters, more particularly to control methods and relevant apparatuses for synchronous rectification in switching mode power converters.

In addition to accurate output voltage or current regulation, power supplies are also required to have excellent power conversion efficiency, which is defined as the ratio of the output power supplied from a power supply to the input power consumed by the power supply.

To increase the power conversion efficiency of a flyback switching mode power converter, the diode in the secondary side, normally used to rectify the voltage or current generated by a secondary winding, is commonly proposed to be replaced by a rectification power switch with a low ON-resistance, so as to reduce the power consumed due to the forward voltage of the diode. This rectification power switch is bi-directional, and an additional synchronous rectifier controller is required to control the rectification power switch.

The timing of turning the rectification power switch ON or OFF is essential for a power supply. When a flyback switching mode power converter operates in a continuous-conduction mode (CCM), for example, LC-tank resonance, the resonance that occurs after the secondary winding no more de-energizes to charge an output voltage, might trigger a synchronous rectifier controller to wrongfully turn a rectification power switch ON, resulting in unnecessary power consumption and possible damage to the rectification power switch.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified. These drawings are not necessarily drawn to scale. Likewise, the relative sizes of elements illustrated by the drawings may differ from the relative sizes depicted.

The invention can be more fully understood by the subsequent detailed description and examples with references made to the accompanying drawings, wherein.

DETAILED DESCRIPTION

The following specification teaches a power converter with a flyback topology as an embodiment of the invention, but the invention is not limited to however. The invention could be embodied by any kinds of switching mode power supplies, such as bulk converters and boosters. It is to be understood that the disclosure and the teaching herein is not intended to limit the scope of the invention.

Figure 1:
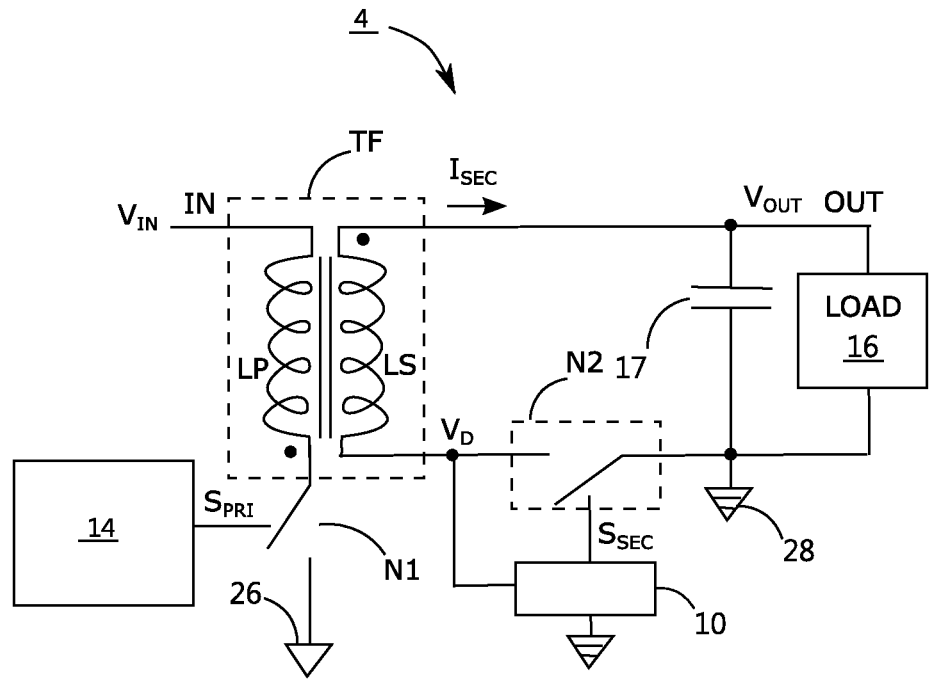
FIG. 1 demonstrates flyback switching mode power converter 4 according to embodiments of the invention.

FIG. 1 demonstrates flyback switching mode power converter 4 according to embodiments of the invention, where transformer TF provides direct-current (DC) isolation between a primary side and a secondary side while primary winding LP and secondary winding LS are inductively coupled to each other.

At input power line IN located in the primary side is input voltage $V_{IN}$. Connected in series between input power line IN and input ground line 26 in the primary side are primary winding LP and power switch N1, which is controlled by control signal $S_{PRI}$ output from power controller 14.

At output power line OUT located in the secondary side is output voltage $V_{OUT}$ supposed to be stabilized by output capacitor 17. Output voltage $V_{OUT}$ and output ground line 28 together supply electric power to load 16. Connected in series between output power line OUT and output ground line 28 are secondary winding LS and rectification power switch N2, which as shown in FIG. 1 is controlled by control signal $S_{SEC}$ output from synchronous rectifier controller 10. The voltage at output ground line 28 is deemed as zero for all voltages in the secondary side. Channel voltage $V_D$ refers to the voltage at the node connecting rectification power switch N2 and secondary winding LS.

Figure 2:
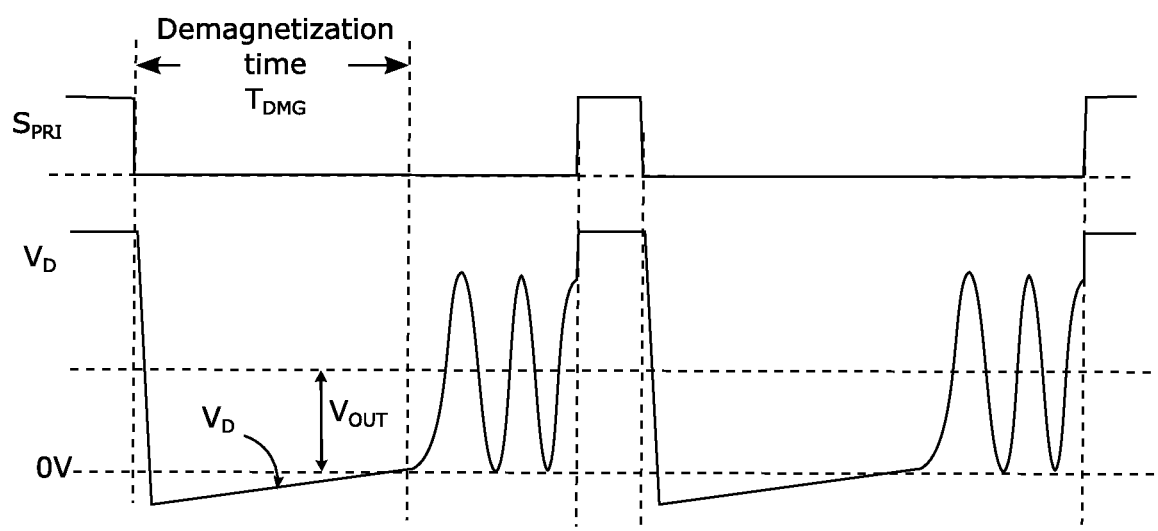
FIG. 2 illustrates waveforms of control signal $S_{PRI}$ of power switch N1 in the primary side and channel voltage $V_D$ in the secondary side.

FIG. 2 illustrates waveforms of control signal $S_{PRI}$ of power switch N1 in the primary side and channel voltage $V_D$ in the secondary side. Following the ON and OFF of power switch N1 controlled by power controller 14, secondary winding LS generates induced voltage and current. As shown in FIG. 2, demagnetization time $T_{DMG}$ starts after power switch N1 is turned OFF. During demagnetization time $T_{DMG}$, channel voltage $V_D$ is negative, and secondary winding LS provides positive induced current $I_{SEC}$ to charge capacitor 17. Generally speaking, rectification power switch N2 is expected to be turned ON only during demagnetization time $T_{DMG}$. After the end of demagnetization time $T_{DMG}$, LC-tank resonance starts, and as a result channel voltage $V_D$ changes up and down, as shown in FIG. 2. During LC-tank resonance, rectification power switch N2 should be turned OFF.

One simple way for synchronous rectifier controller 10 to control rectification power switch N2 is to detect channel voltage $V_D$ and to turn ON rectification power switch N2 only when channel voltage $V_D$ is negative. This simple way theoretically keeps rectification power switch N2 ON only during demagnetization time $T_{DMG}$. Nevertheless, due to noise or unknown reason, channel voltage $V_D$ might unexpectedly, accidentally and briefly become negative during LC-tank resonance. If synchronous rectifier controller 10 employs this simple way, rectification power switch N2 might be wrongfully turned ON to consume power for no purpose and to damage rectification power switch N2 in some circumstances.

Figure 3:
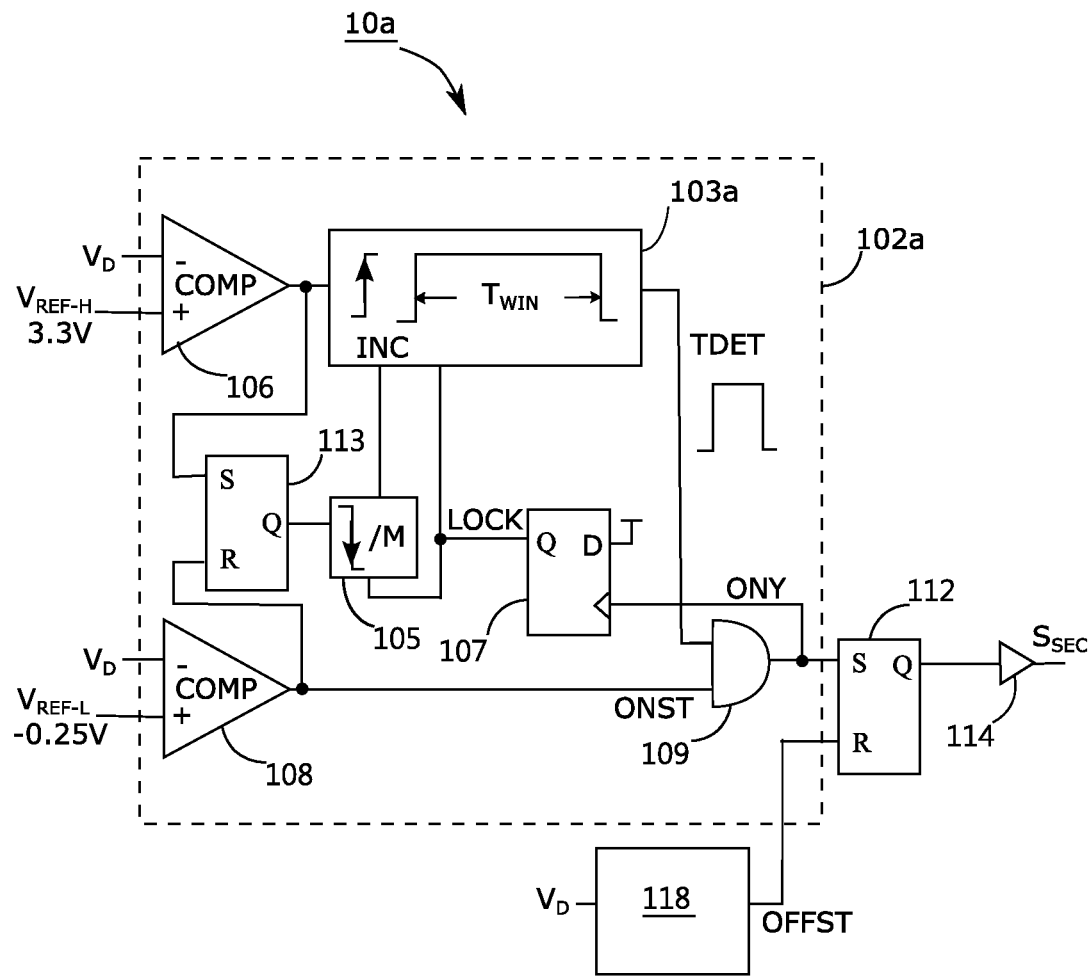
FIG. 3 shows a synchronous rectifier controller according to embodiments of the invention.
Figure 4:
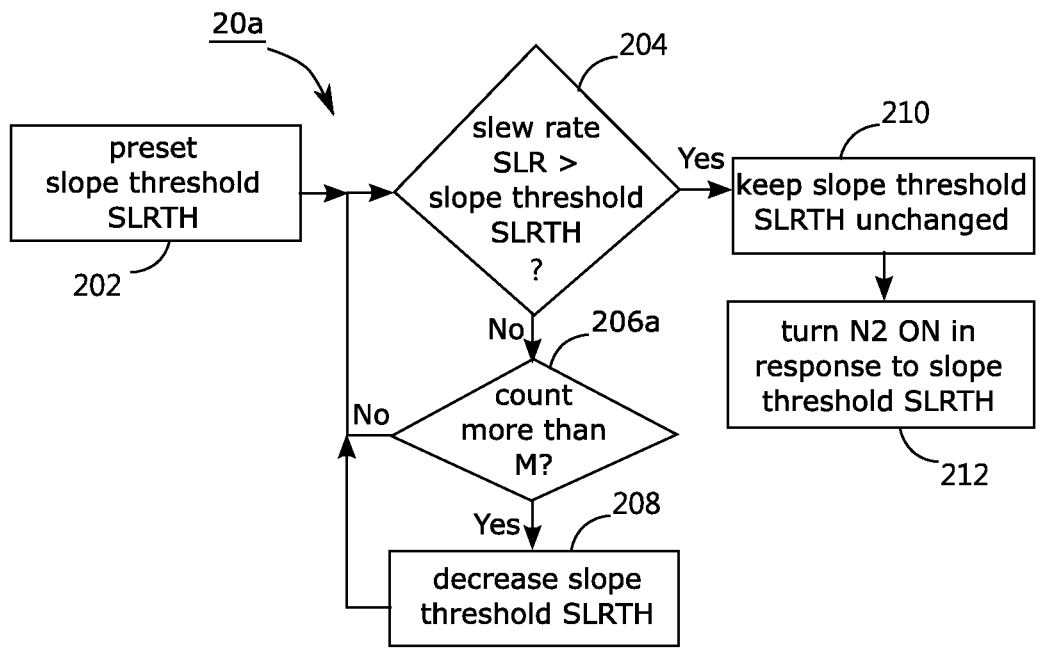
FIG. 4 illustrates a control method employed by the synchronous rectifier controller in FIG. 3.

FIG. 3 shows synchronous rectifier controller 10a, which replaces synchronous rectifier controller 10 in FIG. 1 according to embodiments of the invention. FIG. 4 illustrates control method 20a employed by synchronous rectifier controller 10a in FIG. 3. According an embodiment of the invention, synchronous rectifier controller 10a detects not only whether channel voltage $V_D$ is negative but also slew rate SLR of channel voltage $V_D$ that drops to become negative, and starts turning rectification power switch N2 OFF only when slew rate SLR of channel voltage $V_D$ exceeds slope threshold SLRTH. Furthermore, synchronous rectifier controller 10a adaptively adjusts and sets slope threshold SLRTH to avoid rectification power switch N2 from being wrongfully turned ON.

In response to channel voltage $V_D$, synchronous rectifier controller 10a generates control signal $S_{SEC}$ to control rectification power switch N2. As demonstrated in FIG. 3, synchronous rectifier controller 10a includes slew-rate detector 102a, OFF-signal generator 118, SR flipflop 112, and gate driver 114. Slew-rate detector 102a detects channel voltage $V_D$, checks if slew rate SLR of channel voltage $V_D$ exceeds slope threshold SLRTH, and triggers to turn ON rectification power switch N2 through the help of SR flipflop 112 and gate driver 114 if slew rate SLR is found to exceed slope threshold SLRTH. Gate driver 114 transmits the signal from SR flipflop, but converts it into control signal $S_{SEC}$ with proper voltage or current, to drive rectification power switch N2. OFF-signal generator 118 detects channel voltage $V_D$ to turn rectification power switch N2 OFF through the help of SR flipflop 112 and gate driver 114. For example, OFF-signal generator 118 turns rectification power switch N2 OFF when channel voltage $V_D$ is positive or about to become positive.

Slew-rate detector 102a has comparators 106 and 108, timer 103a, D flipflop 107, divided-by-M divider 105, AND gate 109, and SR flipflop 113. Comparator 106 compares channel voltage $V_D$ with predetermined voltage $V_{REF-H}$, which for example is, but is not limited to, 3.3V. When channel voltage $V_D$ drops down across 3.3V, comparator 106 makes timer 103a start counting delay time $T_{WIN}$, which is the pulse width of pulse TDET output by timer 103a in response to the rising edge of the output of comparator 106.

Comparator 108 compares channel voltage $V_D$ with predetermined voltage $V_{REF-L}$, which for example is, but is not limited to, −0.25V, to generate output signal ONST in response. The combination of comparator 108 and AND gate 109 checks if channel voltage $V_D$ drops down across −0.25V before delay time $T_{WIN}$ ends. In other words, it is checked whether delay time $T_{WIN}$ exceeds time period dT during which channel voltage $V_D$ drops from 3.3V to −0.25V. If time period dT exceeds delay time $T_{WIN}$, AND gate 109 outputs signal ONY with "0" in logic; if it does not, AND gate 109 outputs signal ONY with "1" in logic.

If channel voltage $V_D$ drops down across 3.3V and −0.25V sequentially, SR flipflop 113 accordingly provides a pulse, making divided-by-M divider 105 to add its count by 1. Divided-by-M divider 105 has a counter, which records a count representing how many times channel voltage $V_D$ drops down across 3.3V and −0.25V sequentially. If the count inside divided-by-M divider 105 exceeds M, divided-by-M divider 105 sends a pulse to input node INC of timer 103a and at the same time resets the count. The pulse from divided-by-M divider 105 makes delay time $T_{WIN}$ increase by a predetermined amount. In other words, once channel voltage $V_D$ has dropped from 3.3V to −0.25V for more than M times, delay time $T_{WIN}$, the time window that timer 103a generates, increases. Please note that M could be 1 or any positive integer according to embodiments of the invention.

Slew rate SLR for channel voltage $V_D$ to drop down from 3.3V to −0.25V can be expressed as $(3.3-(-0.25))/dT$ and slope threshold SLRTH is defined as $(3.3-(-0.25))/T_{WIN}$. It can be derived from the aforementioned teaching that signal ONY is "0" in logic if slew rate SLR is less than slope threshold SLRTH, or "1" in logic if it is not.

Figure 5A:
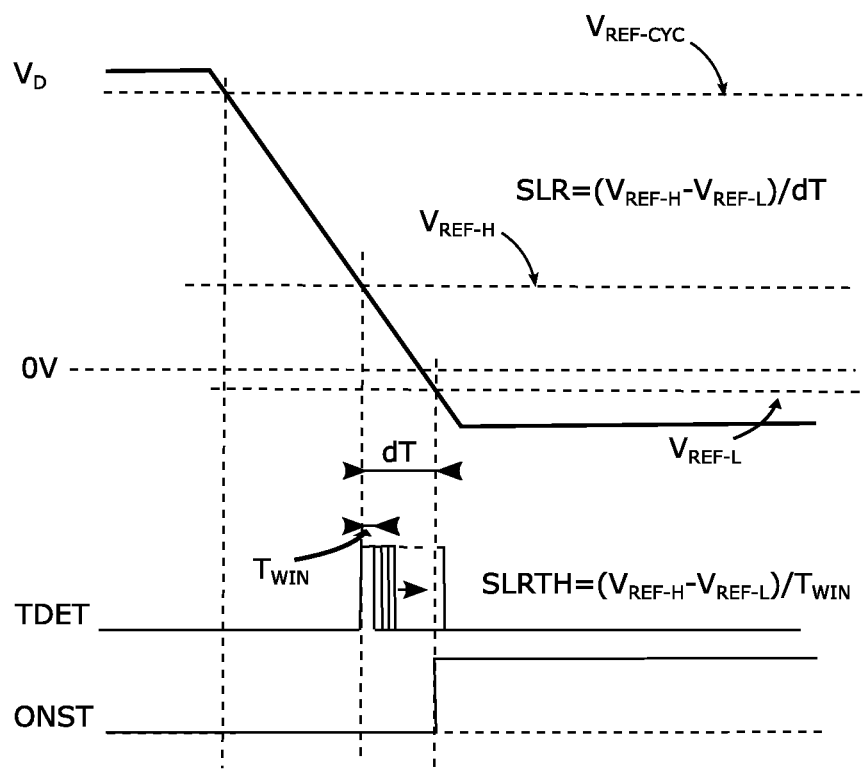
FIG. 5A demonstrates waveforms of channel voltage $V_D$, pulse TDET, and signal ONST around the beginning of demagnetization time $T_{DMG}$.

When D flipflop 107 starts to operate, lock signal LOCK is and will always be "0" if signal ONY is kept as "0", and lock signal LOCK becomes "1" for good once signal ONY turns to "1" in logic. In other words, lock signal LOCK with "0" in logic means that slew rate SLR has not exceeded slope threshold SLRTH yet. Please note that timer 103a stepwise increases delay time $T_{WIN}$ every time when divided-by-M divider 105 sends a pulse to timer 103a if lock signal LOCK is "0". FIG. 5A demonstrates waveforms of channel voltage $V_D$, pulse TDET, and signal ONST around the beginning of demagnetization time $T_{DMG}$. The pulse width of pulse TDET, delay time $T_{WIN}$, is initially so narrow that time period dT is longer than delay time $T_{WIN}$ in the beginning. Accordingly, signal ONY from AND gate 109 is always "0" in the beginning because pulse TDET and signal ONST are not "1" at the same moment. As demonstrated by FIG. 5A, delay time $T_{WIN}$ increases every time when divided-by-M divider 105 sends a pulse to timer 103a. Once delay time $T_{WIN}$ exceeds time period dT does signal ONY briefly become "1" in logic.

Please refer to FIG. 3. In response to the change that signal ONY turns to be "1" in logic, lock signal LOCK output from D flipflop 107 changes from "0" to "1" in logic, generating a rising edge. In response to the rising edge of lock signal LOCK, timer 103a increases delay time $T_{WIN}$ by predetermined offset OFST, and stops divided-by-M divider 105 from counting, so that delay time $T_{WIN}$ remains about a constant ever since according to embodiments of the invention. For instance, delay time $T_{WIN}$ was 60 ns before the rising edge of lock signal LOCK occurs. In response to that rising edge of lock signal LOCK, timer 103a increases delay time $T_{WIN}$ by 20 ns, to become 80 ns, and the counter inside divided-by-M divider 105 stops counting. Delay time $T_{WIN}$ is kept or secured as 80 ns ever since accordingly. Fixed delay time $T_{WIN}$ implies fixed slope threshold SLRTH. According to some embodiments of the invention, predetermined offset OFST could be 0 ns.

Accordingly, slope threshold SLRTH is adaptively set to be slightly less than slew rate SLR of channel voltage $V_D$. It is observed that the falling edge of channel voltage $V_D$ at the beginning of demagnetization time $T_{DMG}$ is normally the steepest in comparison with those happening during LC-tank resonance. The slew rate of this steepest falling edge, however, is hardly predictable and depends on parameters of electric components outside synchronous rectifier controller 10a. Slope threshold SLRTH is adaptively set for synchronous rectifier controller 10a to screen the falling edges of channel voltage $V_D$, so as to find the steepest one that possibly acts as an indication of the beginning of demagnetization time $T_{DMG}$, and to turn rectification power switch N2 ON accordingly. Slew rate SLR, once detected, reflects the slew rate of a real falling edge of channel voltage $V_D$. If slope threshold SLRTH has continuously exceeded slew rate SLR many times, slope threshold SLRTH is too high to find the steepest falling edge of channel voltage $V_D$. Therefore, slope threshold SLRTH decreases every time when slope threshold SLRTH has continuously exceeded slew rate SLR several times, and the decrease of slope threshold SLRTH stops once slope threshold SLRTH becomes less than the slew rate of the steepest falling edge of channel voltage $V_D$. Predetermined offset OFST could be used to further decrease slope threshold SLRTH, so that the steepest falling edge of channel voltage $V_D$ can be found for sure in the future.

Some embodiments of the invention might have delay time $T_{WTN}$ slightly adjusted in response to ambiance temperature or output voltage $V_{OUT}$ of synchronous rectifier controller 10a even though the counter inside divided-by-M divider 105 stops counting.

The rising edge of signal ONY, which implies slew rate SLR exceeds slope threshold SLRTH, sets SR flipflop 112, which in response turns rectification power switch N2 ON via the help of gate driver 114 and control signal $S_{SEC}$.

OFF-signal generator 118 provides OFF signal OFFST in response to channel voltage $V_D$ to reset SR flipflop 112, so as to turn rectification power switch N2 OFF. OFF-signal generator 118 is for example a comparator comparing channel voltage $V_D$ with 0V. When channel voltage $V_D$ is less than 0V, OFF signal OFFST is "0" in logic, and when it is not, OFF signal OFFST is "1" in logic.

As demonstrated by control method 20a in FIG. 4, step 202 presets slope threshold SLRTH to have an initial value. For example, timer 103a initially sets delay time $T_{WTN}$ to have an initial length, so slope threshold SLRTH is preset to have a corresponding initial value.

Step 204 follows step 202, slew-rate detector 102a checking if slew rate SLR of channel voltage $V_D$ exceeds slope threshold SLRTH. By comparing whether time period dT is longer than delay time $T_{WTN}$, slew-rate detector 102a checks if slew rate SLR of channel voltage $V_D$ exceeds slope threshold SLRTH. If the inquiry in step 204 has a positive answer, step 210 follows. If not, step 206a follows.

In step 206a, divided-by-M divider 105 increases a count by 1 to indicate how many times slew rate SLR has been less than slope threshold SLRTH, and checks if this count exceeds M. If the inquiry in step 206a receives a positive response, step 208 follows, where step 208 increases delay time $T_{WTN}$ by a certain amount, equivalently decreasing slope threshold SLRTH. Step 208 also resets the count to be 1. In the opposite, if the inquiry in step 206a receives a negative response, control method 20a goes back to step 204, to check again if slew rate SLR found in the next time exceeds slope threshold SLRTH.

Step 210, in response to the rising edge of lock signal LOCK indicating slew rate SLR exceeds slope threshold SLRTH, increases delay time $T_{WTN}$ by predetermined offset OFST and stops divided-by-M divider from counting, so as to secure delay time $T_{WTN}$ and slope threshold SLRTH as well. Delay time $T_{WTN}$ and slope threshold SLRTH remain unchanged ever since.

Step 212 follows step 210, where synchronous rectifier controller 10a turns rectification power switch N2 ON in response to both slope threshold SLRTH and channel voltage $V_D$.

Figure 5B:
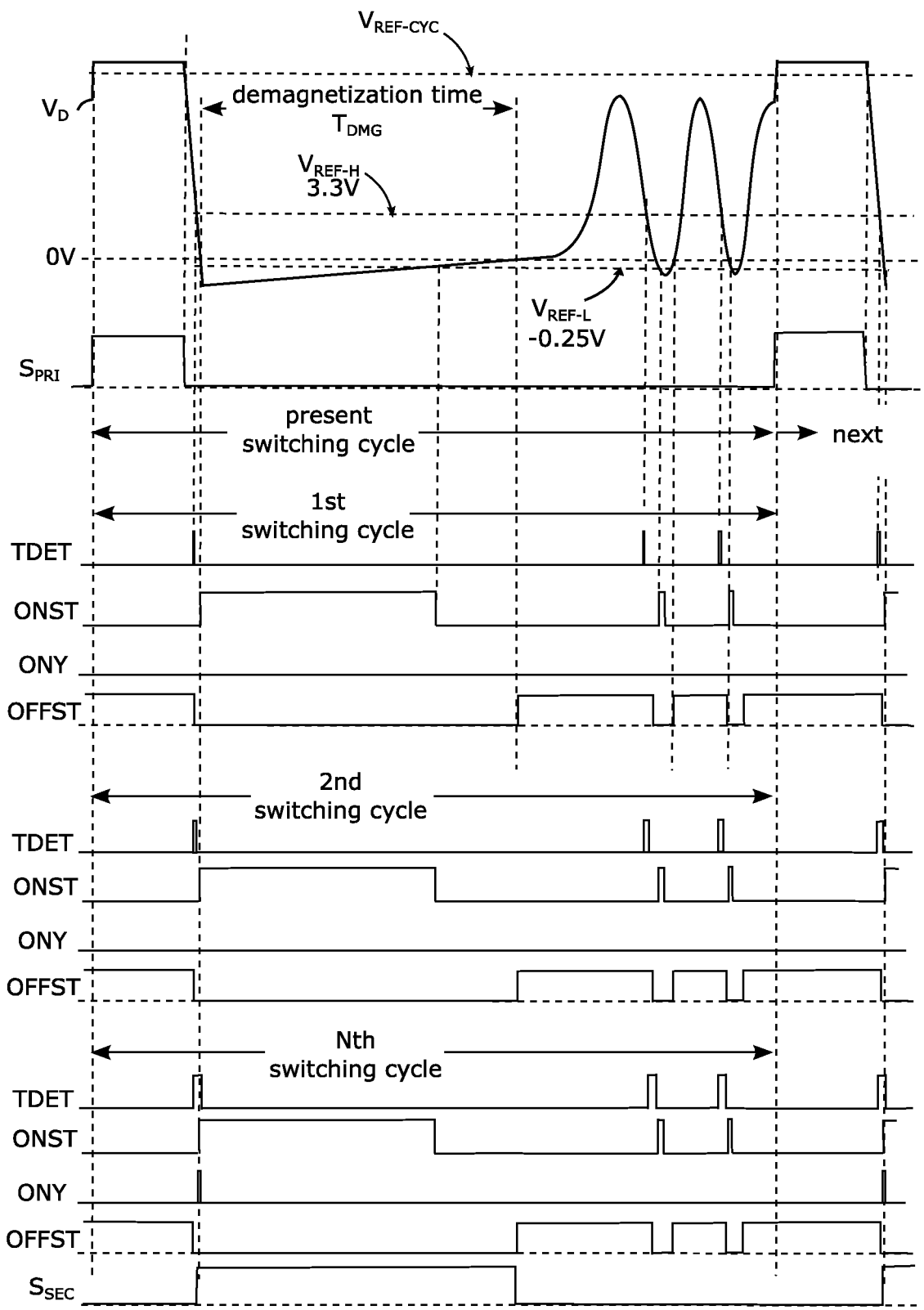
FIG. 5B demonstrates the waveforms of channel voltage $V_D$ and control signal $S_{PRI}$ in about one switching cycle, and the waveforms of pulse TDET, signal ONST, signal ONY, and OFF signal OFFST in about the $1^{st}$, the $2^{nd}$, and the $N^{th}$ switching cycles.

According to embodiments of the invention, FIG. 5B demonstrates the waveforms of channel voltage $V_D$ and control signal $S_{PRI}$ in about one switching cycle, and the waveforms of pulse TDET, signal ONST, signal ONY, and OFF signal OFFST in about the $1^{st}$, the $2^{nd}$, and the $N^{th}$ switching cycles.

It is supposed in FIG. 5B that the waveform of channel voltage $V_D$ in one switching cycle keeps substantially the same switching cycle by switching cycle. In FIG. 5B, the $1^{st}$, the $2^{nd}$, and the $N^{th}$ switching cycles are aligned to each other, so comparison therebetween can be easily conducted. It is also supposed in FIG. 5B that divided-by-M divider 105 is a divided-by-2 divider.

A switching cycle in FIG. 5B is a period of time between two consecutive rising edges of control signal $S_{PRI}$. It is intentionally illustrated in FIG. 5B that channel voltage $V_D$ becomes negative not only during demagnetization time $T_{DMG}$ but also in several brief occasions during LC-tank resonance.

Within the $1^{st}$ switching cycle, every time when channel voltage $V_D$ drops down across 3.3V, timer 103a generates pulse TDET with a pulse width of delay time $T_{WTN}$. Signal ONST turns from "0" to "1" in logic whenever channel voltage $V_D$ drops down across –0.25V. Nevertheless, delay time $T_{WTN}$ is presently so short that it ends before signal ONST becomes "1" in logic, and therefore signal ONY is kept as "0" in logic during the whole $1^{st}$ switching cycle. Delay time $T_{WTN}$ increases after every two consecutive rising edges of signal ONST within the $1^{st}$ switching cycle.

The $2^{nd}$ switching cycle follows the $1^{st}$ switching cycle. As shown in FIG. 5B, the waveforms within the $2^{nd}$ switching cycle are substantially the same with the waveforms within the $1^{st}$ switching cycle, except delay time $T_{WTN}$, the width of pulse TDET, which is wider in the $2^{nd}$ switching cycle. Nevertheless, delay time $T_{WTN}$, which is not long enough yet, still ends before signal ONST becomes "1" in logic, so signal ONY remains as "0" in logic during the whole $2^{nd}$ switching cycle.

If signal ONY has never become "1" yet, delay time $T_{WTN}$ increases once after every two consecutive rising edges of signal ONST, because of divided-by-M divider 105, which is supposed to be a divided-by-2 divider in FIG. 5B.

In the $N^{th}$ switching cycle, signal ONY becomes "1" for a very short time right after a falling edge of channel voltage $V_D$ because delay time $T_{WTN}$, the pulse width of pulse TDET, which has increased before, becomes long enough to overlap a rising edge of signal ONST. Signal ONY accordingly has a short pulse, which not only has timer 103a keep delay time $T_{WTN}$ unchanged, but also turns rectification power switch N2 ON via the help of gate driver 114 and control signal $S_{SEC}$, as shown by control signal $S_{SEC}$ in FIG. 5B.

Signal ONY shown in FIG. 5B also indicates that rectification power switch N2 does not wrongfully turn ON during LC-tank resonance after demagnetization time $T_{DMG}$, even though channel voltage $V_D$ are slightly negative several times during LC-tank resonance. The time period for channel voltage $V_D$ to drop from 3.3V to –0.25V during LC-tank resonance is relatively and significantly longer than that at the beginning of demagnetization time $T_{DMG}$, as it is observed. Therefore, delay time $T_{WTN}$, which is merely long enough to cause a pulse on signal ONY in the beginning of demagnetization time $T_{DMG}$ of the $N^{th}$ switching cycle, should not cause any pulse on signal ONY during LC-tank resonance. Accordingly, embodiments of the invention can prevent rectification power switching N2 from being wrongfully turned ON during LC-tank resonance.

A startup procedure that lasts for several predetermined switching cycles could be implemented and included in synchronous rectifier controller 10a according to embodiments of the invention. This startup procedure begins when the power source for synchronous rectifier controller 10a is ready. The startup procedure, for example, checks time period dT for channel voltage $V_D$ to drop down from 3.3V to –0.25V, finds the maximum dTMax and the minimum dTMin of time period dT, and records the average of the maximum dTMax and the minimum dTMin. During normal operation after the startup procedure, the average is used as delay time $T_{WIN}$ for finding the correct falling edge of channel voltage $V_D$ to turn rectification power switch N2 ON. Expectedly, the maximum dTMax is in association to a falling edge of channel voltage $V_D$ during LC-tank resonance, and the minimum dTMin to another at the beginning of demagnetization time $T_{DMG}$. Therefore, the startup procedure is capable of setting an appropriate reference, the average, for finding the falling edge of channel voltage $V_D$ at the beginning of demagnetization time $T_{DMG}$, and for avoiding wrongfully turning ON of rectification power switch N2 during LC-tank resonance.

Control method 20a in FIG. 4 presets slope threshold SLRTH to have a large value, and decreases it stepwise until the maximum slew rate SLR of channel voltage $V_D$ exceeds slope threshold SLRTH. This invention is not limited to, however. Another control method according to embodiments of the invention presets slope threshold SLRTH to initially have a very small value, increases it stepwise until a predetermined time window, which might include switching cycles, contains no slew rate SLR of channel voltage $V_D$ exceeding slope threshold SLRTH, and then decreases slope threshold SLRTH a little bit so that the maximum slew rate SLR of channel voltage $V_D$ can exceed slope threshold SLRTH.

While the invention has been described by way of examples and in terms of preferred embodiments, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A synchronous rectifier controller, for controlling a rectification power switch connected in series with a secondary winding between two power lines, the synchronous rectifier controller comprising:
    a gate driver for driving the rectification power switch; and
    a slew-rate detector detecting a channel voltage of the rectification power switch, for checking if a slew rate of the channel voltage exceeds a slope threshold, wherein when the slew rate exceeds the slope threshold the slew-rate detector turns ON the rectification power switch through the gate driver, and when the slew rate is less than the slope threshold the slew-rate detector reduces the slope threshold;
    wherein the slew-rate detector comprises a counter to generate a count indicating the times that the slew rate has been less than the slope threshold, and when the count exceeds a predetermined number the slew-rate detector reduces the slope threshold.

2. The synchronous rectifier controller of claim 1, wherein the slew-rate detector comprises:
    a first comparator comparing the channel voltage with a first predetermined voltage;
    a second comparator comparing the channel voltage with a second predetermined voltage;
    a timer to count, in response to an output from the first comparator, a delay time; and
    a logic connected to the second comparator and the timer, for checking if the channel voltage goes across the second predetermined voltage before the delay time ends;
    wherein the slew-rate detector increases the delay time if the channel voltage goes across the second predetermined voltage after the delay time ends.

3. The synchronous rectifier controller of claim 2, wherein, if the channel voltage goes across the second predetermined voltage before the delay time ends, the slew-rate detector increases the delay time by a predetermined offset and then secures the delay time.

4. The synchronous rectifier controller of claim 1, if the slew rate exceeds the slope threshold the slew-rate detector secures the slope threshold.

5. The synchronous rectifier controller of claim 1, wherein the slew-rate detector adjusts the slope threshold in response to an ambiance temperature of a power supply or an output voltage of the power supply.

* * * * *